United States Patent
Klingen et al.

(10) Patent No.: US 7,198,441 B2
(45) Date of Patent: Apr. 3, 2007

(54) METHOD AND MACHINE FOR CUTTING SPIRAL BEVEL GEARS

(75) Inventors: Ralf Klingen, Hueckeswagen (DE); Torsten Koenig, Radevormwald (DE); Herbert Blasberg, Remscheid (DE)

(73) Assignee: Klingelnberg GmbH, Hueckeswagen (DE)

(*) Notice: Subject to any disclaimer, the term of this patent is extended or adjusted under 35 U.S.C. 154(b) by 518 days.

(21) Appl. No.: 10/837,076

(22) Filed: Apr. 30, 2004

(65) Prior Publication Data
US 2005/0025597 A1     Feb. 3, 2005

(30) Foreign Application Priority Data
Jul. 29, 2003   (DE) ................. 103 34 493

(51) Int. Cl.
*B23F 9/12* (2006.01)
(52) U.S. Cl. ............. 409/26; 409/27; 409/25; 409/61
(58) Field of Classification Search .......... 409/2, 409/25–27, 29, 38, 50–51, 61; *B23F 9/00, B23F 9/10, 9/12*
See application file for complete search history.

(56) References Cited

U.S. PATENT DOCUMENTS

| | | | |
|---|---|---|---|
| 2,284,636 A | | 6/1942 | Carlsen |
| 2,824,498 A | * | 2/1958 | Baxter, Jr. et al. ............ 409/26 |
| 3,099,939 A | * | 8/1963 | Haase et al. .................. 409/25 |
| 3,138,995 A | * | 6/1964 | Treverton ..................... 409/25 |
| 3,222,990 A | * | 12/1965 | Rebeski ....................... 409/26 |
| 3,653,290 A | | 4/1972 | Hunkeler |
| 5,961,260 A | | 10/1999 | Käsler et al. |
| RE38,504 E | | 4/2004 | Käsler et al. |

FOREIGN PATENT DOCUMENTS

| | | |
|---|---|---|
| DE | 2131 503 | 1/1972 |
| DE | 37 52 009 T3 | 4/2004 |
| EP | 883 460 B1 | 5/2002 |
| GB | 972365 | 10/1964 |
| WO | WO 89/01838 | 3/1989 |
| WO | WO 97/31746 | 9/1997 |

* cited by examiner

Primary Examiner—Daniel W. Howell
(74) Attorney, Agent, or Firm—McCormick, Paulding & Huber LLP

(57) ABSTRACT

In the single-indexing method, the blades are positioned in a circle on a cutter head, so that all of the blades run through a tooth space to be produced during cutting of a bevel gear. The workpiece is then rotated by one pitch and the continuously rotating cutter head may then cut the next tooth space. Since the blades do not all have their intended shapes and positions, different structures arise on the tooth flanks, which lead to deviations in the pitch measurement. In order to avoid this, a face-milling method is suggested in which the cutter head gets the same angular position around its axis in relation to the tooth space to be produced as for the preceding space. This has the result that all tooth spaces are not more precise overall, but their surface structures are identical and the pitch measurement is thus not falsified.

11 Claims, 3 Drawing Sheets

METHOD AND MACHINE FOR CUTTING SPIRAL BEVEL GEARS

CROSS-REFERENCE TO RELATED APPLICATION

This application is entitled to the benefit of and incorporates by reference essential subject matter disclosed in German Patent Application No. DE 10334493.4 filed on Jul. 29, 2003.

FIELD OF THE INVENTION

The present invention relates generally to a method and apparatus for cutting spiral bevel and hypoid gears.

BACKGROUND OF THE INVENTION

One method for cutting spiral bevel and hypoid gears is known as the face-milling method with single indexing. In contrast to the continuous indexing method, a tooth space is always first completely produced using the cutter head in this case, the workpiece is indexed further by one tooth spacing, the next tooth space is then cut in the same way, etc., until the workpiece has become a complete bevel gear. For spiral bevel gears, which were manufactured according to this method, the tooth flanks have a lengthwise curvature in the shape of a circular arc.

In this case, the term "spiral bevel gears" is to include both nonoffset and offset bevel gears. If one wishes to differentiate between the two types, the offset bevel gears are referred to as hypoid gears.

Furthermore, there have historically been two production processes for spiral bevel gears and hypoid gears. In one case, the tooth spaces of the pinion and ring gear of a bevel gear pair are each produced in generating processes, in the other case, the tooth spaces of the ring gear are only produced by plunging the rotating cutter head into the stationary workpiece, while in contrast the pinion gaps are produced in a special generating process using an appropriately tilted cutter head. While in the plunge process, the shape of the blades of the cutter head is transferred to the tooth flanks in that the cutter takes one chip at a time over the entire length and depth of the flank, in the generating process, in which the cutter head and workpiece move in relation to one another in accordance with a specific regularity, the tooth flanks are implemented through enveloping cuts of the individual cutter blades.

The related art also includes other milling processes for spiral bevel gears, one of these is described, for example, in EP 0 883 460 (based on the application WO/US97/02086 and the US priority application 60/015,380), which do not have to be gone into in further detail here, however.

For both important processes, in the Gear Handbook, FIG. 20-2 and FIG. 20-7, machines which operate purely mechanically are described, the generating machine (generator) having a rolling drum or cradle and a separate mechanism for tilting the cutter head. In contrast, modern CNC machines for cutting spiral bevel and hypoid gears, as described, for example, in DE 196 46 189 C2 (corresponds to U.S. Pat. No. 5,961,260) or in DE 37 52 009 T2, may achieve this without a rolling drum and without a tilt mechanism, solely through spatial motions of the tool carrier and workpiece carrier. For the single-indexing method, only five controlled axes are necessary for this purpose, three translational and two rotational. The missing sixth degree of freedom for the general position of a rigid body in space, in this case the cutter head in relation to the workpiece, is the rotation of the cutter head around its rotational axis. It is not necessary as a controlled axis in the single-indexing method, because the cutter head is rotationally symmetric and its drive—independently of the other five axes—is only necessary to achieve a desired cutting speed.

Such CNC machines achieve significantly greater operating speeds than purely mechanical bevel gear cutting machines, while simultaneously having more precise setting and travel motions, and are therefore more cost-effective. In spite of this, it has been shown in the quality evaluation of the cut spiral gears with the aid of pitch measurement that the measured results may frequently not be brought into harmony with the overall precision of the CNC machines. The results are worse than expected, although the pitch measurement device operates perfectly.

Besides the cutting machine, the cutter head is also of decisive importance for the precision of the cut bevel gears. For some time there have already been efforts, therefore, particularly in cutter heads for the single-indexing method, to elevate the positional precision of the cutter used. For example, a device is known from the publication DE 200 19 937 U1 (based on PCT/US87/02083), for optimally aligning stick blades in a cutter head. Nevertheless, it is unavoidable that there is at least one blade on the rotating cutter head which lies radially furthest to the cutter head axis and at least one blade which lies closest to it.

This fact is taken into consideration according to the related art in plunge milling of ring gears in the form cutting method in that at the end of each plunged tooth space, the cutter head performs at least one more complete rotation without infeed. In this way, it is to be ensured that the two blades which remove the most are run through the tooth space at least once and thus all gaps are the same. However, this method may not be transferred to the generating process and is also unsatisfactory in the plunge process because it requires additional processing time and increases the wear of the cutter which does not approach the cut correctly.

Therefore, it is the object of the present invention to implement a method and a machine of the type initially cited in such a way that spiral bevel and hypoid gears may be face-milled more uniformly than before, without an additional time expenditure and this is also reflected in the result of the pitch measurement.

SUMMARY OF THE INVENTION

The present invention relies in one aspect to a method for cutting spiral bevel and hypoid gears using a cutter head driven around a rotational axis. The cutter head and a work piece are guided into their starting positions and a complete tooth space is produced using a cutting process that involves the rotating cutter head. Once the complete tooth space is produced the cutter head is returned along with the work piece to the initial starting positions. The work piece is then rotated by one pitch and the next tooth space completed, these steps are repeated until all the tooth pieces of the work piece are finished, however, with the additional step of indexing the cutter head at a predetermined instance to an identical angular position around its rotational axis relative to the tooth space to be produced as was done with the preceding tooth space. This additional step corresponding to an angular compensation.

The present invention resides in another aspect to a machine for cutting spiral bevel and hypoid gears that uses the above-described cutter head in a single indexing method. The machine includes a CNC type controller and a drive motor for rotating the cutter head about its rotational axis. A first device is provided for guiding the cutter head and the work piece into their starting position. A second device is also provided for also provided for producing a complete tooth space through a milling process using the rotating cutter head and for returning the cutter head and the work piece to their starting position. Yet a third device is provided for rotating the work piece by one pitch and additional control means are used such that at a presetable instant, the cutter head can be set to an angular position relative to the tooth space to be produced.

The present invention involves the recognition that the unavoidable differences of the individual blades of a cutter head and the small deviations thus arising on the flank surface depend on the following. Although an entirely exact surface structure may not be achieved, they are at least to be identical from tooth space to tooth space. According to the related art, this is not the case. This is because the cutter head rotates continuously while the machine cuts one tooth space after another in repeating cycles. It would be random coincidence if the cutter head had reached precisely the same angle at the end of a milling cycle as at the beginning. Therefore, the next cycle will begin with another angle. In general, the cutter head thus differs in its angular position from space to space, and correspondingly, observing the same point on each tooth flank, always another blade will have cut at this point.

According to the present invention, through which the cutter head gets the same angular position at a presetable instant of each new face-milling cycle, an effect is achieved which may be explained more easily with a plunging method: under identical starting conditions and a constant process sequence, because it is computer-controlled, the same blade will also always execute the last cut at the plunge end and therefore give the entire tooth flank its final form. Therefore, it is no longer necessary to have the cutter head make at least one additional rotation for each tooth space. Although the time won for each gap is small, the processing time may be significantly reduced for a ring gear having 41 teeth, for example, without, however, having to accept reductions in the precision of the bevel gear teeth in relation to the typical methods.

In the generating process—at least theoretically—all blades participate in the structure of enveloping cuts of the tooth flanks and the effect of the measure according to the present invention is not as obvious as in the plunging process. An investigation of typical generated tooth flanks has shown that the unavoidable differences of the cutter blades (small positional and pressure angle deviations) are imaged phase-shifted on the individual tooth flanks. The pitch measurement, in which all tooth flanks of a gear are always sensed precisely at the same point, therefore also detects deviations which result only from the phase-shifted enveloping cuts in that, in the most unfavorable case, the measurement is sometimes performed in the trough and sometimes on the peak of an enveloping cut. However, if the generating process according to the present invention is always begun with the same angle of the cutter head, the structure of enveloping cuts on all tooth flanks is also identical and the pitch measurement is no longer distorted by the phase shift.

There are two possibilities for achieving this effect according to the present invention. The angle compensation is either performed for each individual tooth space or only once for the entire workpiece and/or an entire workpiece series. For the second possibility, it is ensured using the additional method step that by adapting the process data and by a computer-controlled process sequence, the cutter head automatically begins to cut each new tooth space at the same angle. Therefore, the requirement of providing all tooth flanks with an identical surface structure, independently of whether it is a plunge or a generating process, is fulfilled. For the second possibility, it is not left to random coincidence in which angular position the cutter head is located at each instant of processing of a spiral bevel gear in the single-indexing method. Further details will be discussed later in the description of the machine.

For the first possibility, the repeating angular compensation of the cutter head in relation to the tooth spaces to be produced, it is unimportant for the effect according to the present invention which side, cutter head or workpiece, or possibly both, has its angle adjusted. Since, however, the cutter head rotates significantly more rapidly during face-milling than the workpiece, it is advisable to perform the angular compensation as follows. While the cutter head rotates continuously, the cutting process or its continuation after an interruption is started precisely at the moment in which a specific mark on the cutter head spindle passes a fixed barrier, e.g., when the reference mark of a shaft encoder passes zero.

In an advantageous embodiment of the method according to the present invention, the time for the angular compensation is placed at the beginning of each milling process. This is not self-evident if one considers that, for example, a generating process may be designed in different ways. For bevel pinions having small number of teeth, the cutter head is generally moved out from the start or even index position to the cutting depth just above the workpiece and the generating process is begun from there. The cutter head must then cut away a large quantity of material from the blank before it begins the first enveloping cut for the finished tooth flank. Although, as noted above, only the identical final structure of enveloping cuts is significant, the angular compensation is not to occur only upon the first envelope cut. This is because the generating process must be interrupted for this purpose, which costs additional time. It is different for bevel gears, for example, whose tooth spaces are pre-cut in a plunge-generating process, simultaneous plunging and generating. This procedure preferably ends in a roll setting in which the "first" enveloping cut is to be generated. In this case, it may be advantageous to first perform the angular compensation in this moment.

In a further advantageous embodiment of the present invention, the instant for the angular compensation of the cutter head is set shortly before the end of the plunge process. This may be advantageous for bevel gear materials which are difficult to remove chips from, if, upon reaching a greater plunge depth and correspondingly larger chips, the machine becomes unsteady and the surface of the tooth flanks worsens. In this case, the time lost for interrupting the plunge process is accepted in favor of a better and uniform surface. In spite of this, the time won outweighs the typical method, in which at least one further complete rotation of the cutter head without depth advance is executed in addition.

The machine according to claim 7 for performing the method according to the present invention may be either a CNC machine having a roller drum and a tilt mechanism for the cutter head or a modern 5-axis machine, as was already described above. In the first case, the three devices from the preamble, using which the typical method steps are performed, may still be differentiated on the basis of the moving axes. For a 5-axis machine, this is not possible without something further. In this case, up to five axes move simultaneously during the three method steps of a face-milling cycle, but according to different control programs which may be assigned to the three devices. In both cases, the machine according to the present invention is distinguished by the additional control means according to claim 7.

The decisive advantage of this machine for the single-indexing method is that its CNC controller is programmed in such a way that at a presettable instant of the face-milling process, an angular compensation of the cutter head rotation in relation to the tooth space to be produced is performed and the machine thus mills all tooth spaces with a sufficiently identical surface structure. Through the possibility of selecting the instant, the machine may be used more flexibly because the processing process may be designed optimally.

The further embodiment of the machine according to the present invention is essentially determined by which of the two possibilities for the angular compensation of the cutter head is to be used. If, as already cited as the first possibility, the angular compensation is to be repeated for each tooth space, the additional control means is programmed relatively simply. Upon a signal, which is triggered by a specific angular position of the cutter head spindle in relation to the machine, the face-milling process provided begins with a time-monitored starting phase. In this way, it is ensured that this procedure and also the further process sequence always repeats in the same way. It is insignificant for the present invention, for giving each tooth space the same surface structure, whether the rotation of the cutter head results from a regulated or a controlled axis.

For the second possibility, performing the angular compensation only once for a workpiece or a series of identical workpieces, the outlay for the additional control means is somewhat greater. The machine must automatically determine the time which is necessary for method steps c) to e), the complete processing of a tooth space, from all of the process data input into the CNC controller of the machine, such as cutting speed, advance, travel and indexing speed, etc. In this time, the cutter head is to make an arbitrary number of rotations, but they are to be exactly complete. The control means according to the present invention is then preferably programmed in such a way that it changes the speed of the cutter head slightly in order to fulfill the condition cited. To reliably maintain the complete rotations for all tooth spaces of a workpiece, it is advantageous if the cutter head axis is also a controlled axis. This is not a disadvantage for modern CNC roller milling machines for spiral bevel gears if they may operate both in the single-indexing method and in the continuous indexing method. This is because they require the sixth axis, the controlled axis for the cutter head, for continuous indexing in any case.

BRIEF DESCRIPTION OF THE DRAWINGS

Further particulars of the present invention are described in greater detail in the following with reference to the drawing.

DETAILED DESCRIPTION OF THE PREFERRED EMBODIMENTS

Figure 1:
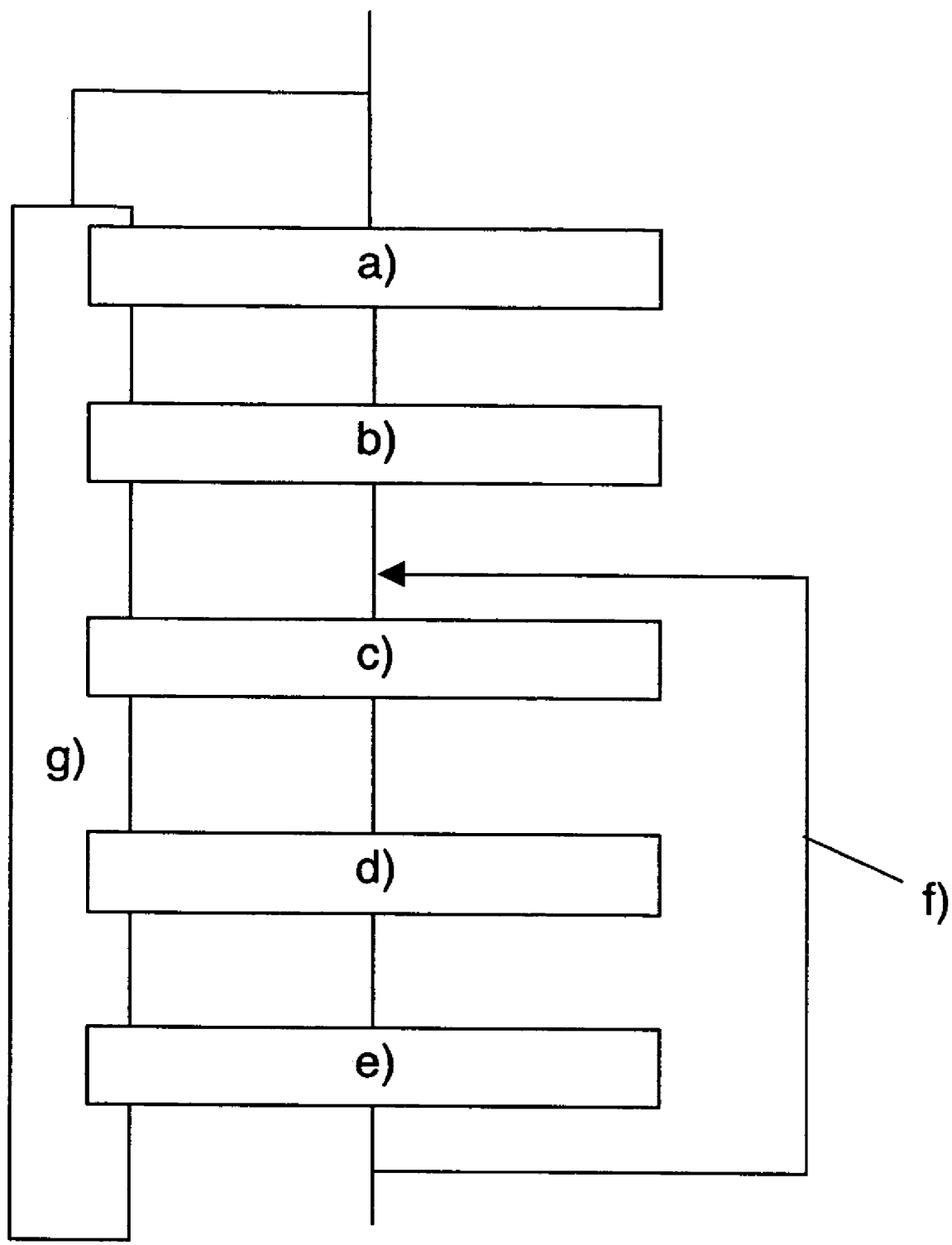
FIG. 1 shows a flowchart for the method of face-milling bevel gears according to the present invention.

First, the known, most important steps for face-milling spiral bevel gears in the single indexing method are shown in FIG. 1. These are the driving of the cutter head around its rotational axis in box a, the guiding of the cutter head and the workpiece into their particular starting positions in box b, the production of a complete tooth space through a face-milling process using the rotating cutter head in box c, the return of the cutter head and the workpiece to their starting positions in box d, and the rotation of the workpiece around a tooth index, either simultaneously with the preceding method steps or thereafter, in box e. Only a preferred temporal sequence of the method steps is to be shown using this illustration. For an identical bevel gear, boxes a and b or d and e may also be switched. The arrow f is to indicate the repetition of boxes c to e until all tooth spaces of a workpiece are finished.

In addition, the box g for the additional method steps according to the present invention is shown, through which, at a presettable instant, the cutter head receives an identical angular position around its rotational axis in relation to the tooth space to be produced as for the preceding tooth space, which corresponds to an angular compensation. The superposition of the box g is to express that the angular compensation may occur at different instants, and may be preset as a function of the workpiece properties: either for each tooth space, preferably at the beginning of each generating process, but also shortly before the end of each plunge process for plunge milling of specific ring gears, or only once at the beginning of a workpiece, in that through a change of process data—preferably the cutting speed—the necessary time for the steps of boxes c to e precisely corresponds to complete rotations of the cutter head.

Figure 2:
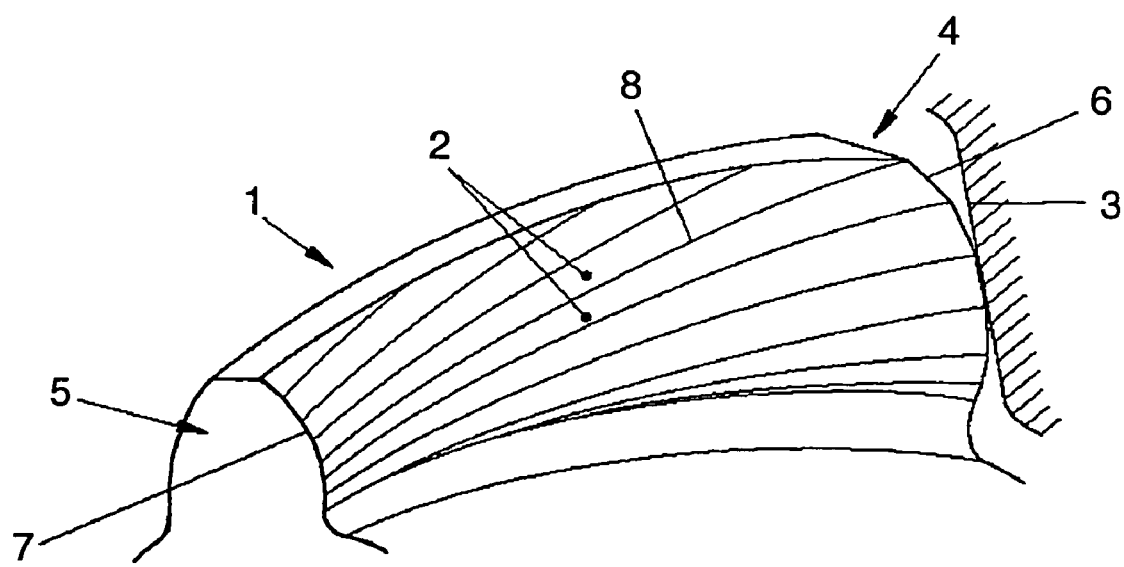
FIG. 2 shows the theoretically resulting enveloping cut of the concave tooth flank of a bevel pinion.

It may be seen from FIG. 2 that under theoretically correct conditions, a uniform, systematic structure of enveloping cuts is implemented during the generating of the concave tooth flank 1 of a bevel pinion, for example. For clarity, only a few enveloping cuts 2 have been selected, which is to be achieved through a large generating feed and/or fewer blades on the cutter head. This is because the blades hit the tooth flank at specific time intervals, in which the workpiece has rotated a little further. The particular subsequent blade thus cuts on its own, somewhat offset path. Of course, significantly more enveloping cuts result in practice, even if, for teeth which are to be hardened and ground after cutting, a coarser structure is permissible.

Since the cutting edge 3 which cuts on the tooth flank 1 is essentially straight, polygonal progressions 6, 7 arise—e.g., on the two lateral end faces 4, 5 or even on another profile section of the tooth flank—which envelop the theoretical, continuously curved flank faces. The illustrated lines 8 of enveloping cuts thus arise where two neighboring enveloping cut faces 2 intersect. They are therefore edges which are implemented at a slight interval (peak) above the theoretical flank face. The enveloping cut face 2 touches the theoretical flank face approximately on its centerline, and therefore does not have an interval thereto (valley). For weak curvature of the flank face, the enveloping cut faces 2 are broader than for strong curvature, because of which the lines 8 of enveloping cuts run closer and closer together from the addendum to the dedendum of the tooth.

Figure 3:
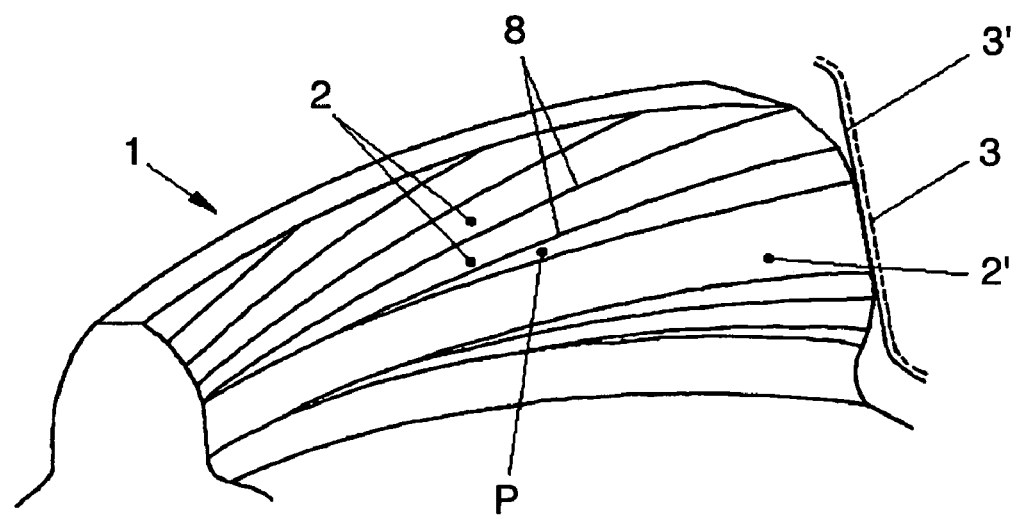
FIG. 3 shows a flawed structure of enveloping cuts on the concave tooth flank of the bevel pinion according to FIG. 1.

If, as shown in FIG. 3, the cutting edge 3' projects in relation to the dashed correct cutting edge 3, and radially to the cutter head axis, the corresponding enveloping cut face 2' becomes so wide that it partially cuts away the neighboring faces. It is, of course, a special case in which only the cutting edge 3' projects while all of the others have their correct positions. In spite of this, it may be shown well in the special case how the tooth flank of the neighboring tooth may appear under these conditions.

FIG. 4 again shows the projecting cutting edge 3", which, however, has cut in a different generating position than in the tooth flank shown in FIG. 3 and has produced the enveloping cut face 2". This is typical for the normal generating process, because the continuously rotating cutter head has begun the enveloping cut production in a different angular position than in FIG. 3. In addition, it may be seen from the enveloping cut faces 2, which are otherwise correct, that they are also slightly shifted in relation to those on the preceding tooth flank. This may be trivial in non-critical cases, but leads to the following effect here.

Figure 4:
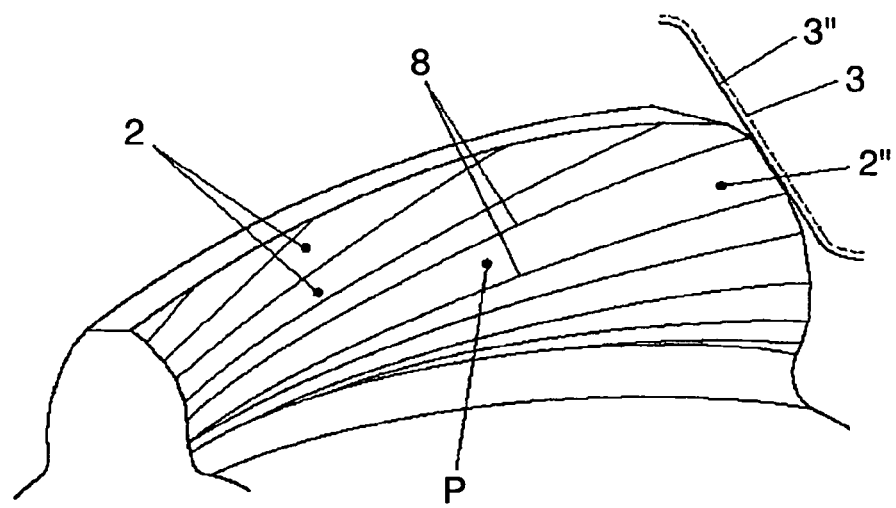
FIG. 4 shows the flawed structure of enveloping cuts of the tooth flank neighboring that of FIG. 2.

If a pitch measurement is performed on the bevel pinion under discussion, the ball probe of a typical measuring device also detects the two tooth flanks shown in FIG. 3 and FIG. 4. The ball will sense each of the tooth flanks in a point P which has a constant interval in relation to the rotational axis of the bevel pinion in the measurement device and is also not displaced in the lengthwise direction of the tooth. This point P is precisely next to a line 8 (peak) of enveloping cuts in FIG. 3, for example, and is approximately in the middle of the enveloping cut face 2" (trough) in FIG. 4. Because of this, the measurement device determines a spacing deviation between the two tooth flanks, although the enveloped flank faces are located in the intended pitch to one another.

In contrast, if the bevel pinion is milled according to the method according to the present invention, the structure of enveloping cuts on the neighboring tooth flank, and on all other concave flanks, looks precisely like that of FIG. 3. The point P is also always at the same position, i.e., always precisely next to the corresponding line of enveloping cuts, with the requirement, of course, that the bevel pinion was received in the measurement device without radial runout. This is because the pitch measurement no longer shows deviations for this special case of one single projecting cutting edge, since the enveloped flanks are also positioned in the intended pitch to one another.

In the real generating on a machine according to the present invention, a corresponding effect results as in the special case described. This is because practically no cutting edges of the cutter head are exactly in their setpoint positions, and the spacing deviations measured are naturally not zero, but are significantly smaller than in the typical method. They then correspond to that which is to be expected on the basis of the overall precision of the machine. This goal may be achieved without requiring more time for the processing than on a typical machine.

Figure 5:
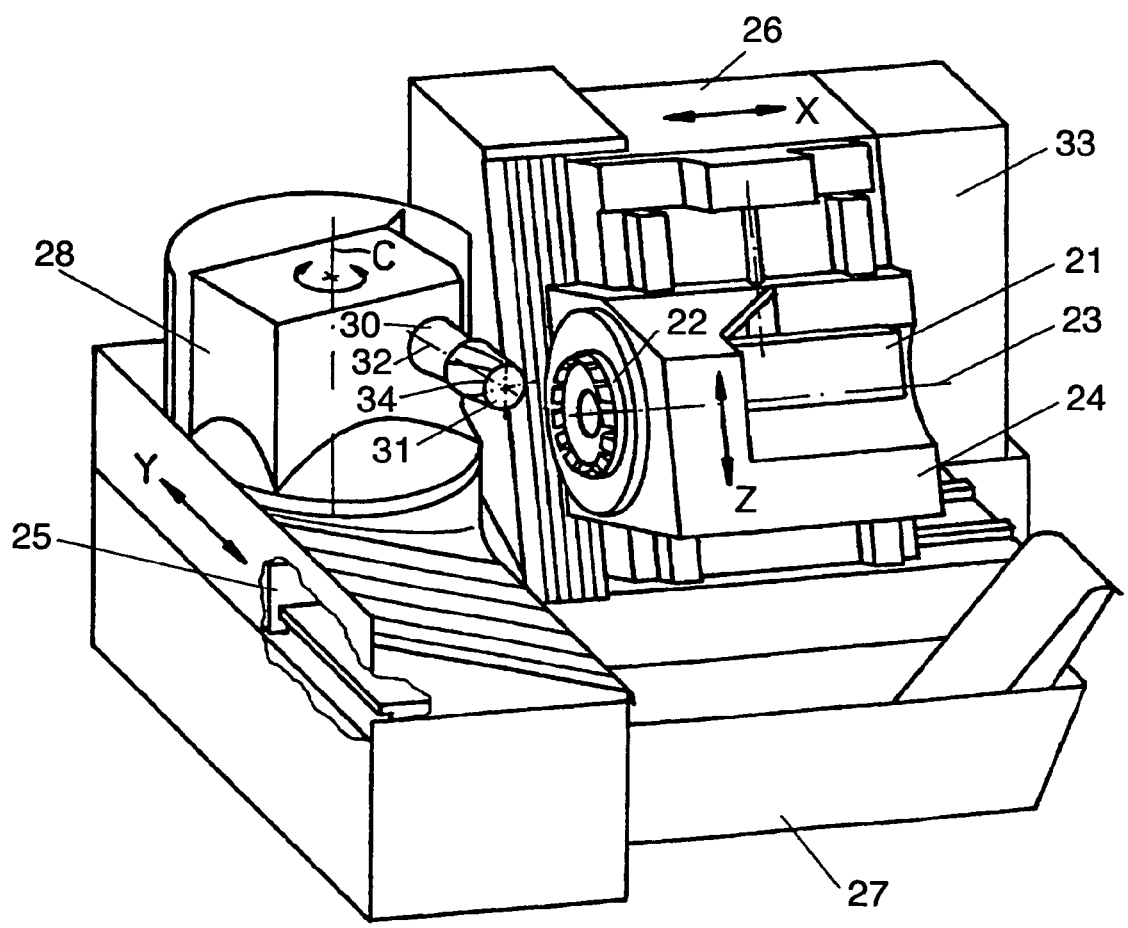
FIG. 5 shows a schematic illustration of a machine according to the present invention.

An example of a machine according to the present invention is shown in FIG. 5. Externally, it corresponds to the CNC machine for producing spiral bevel gears already cited, which is described in DE 196 46 189 C2 (corresponds to U.S. Pat. No. 5,961,260). It has a drive motor 21 for rotating the cutter head 22 around its rotational axis 23. Motor 21 and cutter head 22 are located on a first slide 24, which is guided laterally on a machine housing 26 and whose height may be adjusted (Z-axis). The machine housing 26 is in turn horizontally (X-axis) movable on a machine base 27, on which a second slide 25 is also located. This slide 25 carries a workpiece carrier 28, rotatable around a vertical axis C, having a workpiece spindle 30 and a workpiece 31, which is rotatably mounted in the workpiece carrier 28 around its horizontal axis 32. The slide 25 is also movable horizontally (Y-axis), but perpendicularly to the X-axis of the machine housing 26 and to the Z-axis of the first slide 24. These machine parts thus form a device, using which the cutter head 22 may be brought into any desired position in relation to the workpiece 31 during a face-milling process.

Combinations of this device with different control programs of the control unit 33 of this CNC machine form:

the first device for guiding the cutter head 22 and the workpiece 31 into their starting positions for milling, the moved axes X, Y, Z, and C not being independent of one another, the second device for producing a complete tooth space 34, the four axes previously cited and the axis 32 of the workpiece 31 having to execute a coupled motion if it is a generating process, or only the machine housing 26 having to be moved (X-axis), if it is purely a plunge process in a ring gear, and the third device for rotating the workpiece 31 by one pitch around the horizontal axis 32.

In addition, the control unit 33 of the machine according to the present invention also has the additional control means, using which the angular compensation between the cutter head rotation and the workpiece rotation already extensively described may be performed.

What is claimed is:

1. A method for cutting spiral bevel and hypoid gears using a cutter head which includes the following steps:
   a) driving the cutter head around its rotational axis,
   b) guiding the cutter head and a workpiece into their starting positions,
   c) producing a complete tooth space through a cutting process using the rotating cutter head,
   d) returning the cutter head and the workpiece to their starting positions,
   e) rotating the workpiece by one pitch either simultaneously with the preceding method step or subsequently thereto,
   f) repeating steps c) to e) until all tooth spaces of the workpiece are finished with the additional step of indexing the cutter head at a predetermined instant to an identical angular position around its rotational axis relative to the tooth space to be produced as with the preceding tooth space, this additional step corresponding to an angular compensation.

2. The method according to claim 1, wherein the additional method step is repeated for each tooth space and the instant for the angular compensation of the cutter head is preferably provided at the beginning of each milling process.

3. The method according to claim 1, wherein the additional method step is only performed once for a workpiece or a workpiece series in that the time necessary for steps c) to e) is adjusted by changing process data to achieve precise complete rotations of the cutter head.

4. The method according to claim 1, wherein the milling process for generating the tooth spaces is performed through enveloping cuts in a generating process.

5. The method according to claim 1, wherein the milling process for producing the tooth spaces of ring gears is a plunge process.

6. The method according to claim 5, wherein the instant for the angular compensation of the cutter head is provided shortly before the end of each plunge process.

7. A machine for cutting spiral bevel and hypoid gears using a cutter head in the single-indexing method including at least:
 a) a CNC controller,
 b) a drive motor for rotating the cutter head around its rotational axis,
 c) a first device for guiding the cutter head and a workpiece into their starting positions,
 d) a second device for producing a complete tooth space through a milling process using the rotating cutter head and for returning the cutter head and the workpiece to their starting positions,
 e) a third device for rotating the workpiece by one pitch, and additional control means being provided, using which, at a presettable instant, the cutter head may be set in an angular position around its rotational axis identical in relation to the tooth space to be produced as for the preceding tooth space.

8. The machine according to claim 7, wherein the angular compensation of the cutter head may be performed again for each tooth space using the additional control means.

9. The machine according to claim 7, wherein process data for a workpiece are changeable and thus the time necessary for the steps c) to e) is adjusted to achieve precisely complete rotations of the cutter head using the additional control means.

10. The machine according to claim 7, wherein the second device is provided for producing the tooth spaces through enveloping cuts in a generating process.

11. The machine according to claim 7, wherein the second device is provided for producing the tooth spaces of ring gears through a plunge process.

* * * * *